United States Patent
Adachi

(10) Patent No.: US 9,760,323 B2
(45) Date of Patent: Sep. 12, 2017

(54) IMAGE PROCESSING APPARATUS, AND METHOD AND COMPUTER-READABLE MEDIUM FOR THE SAME

(71) Applicant: BROTHER KOGYO KABUSHIKI KAISHA, Nagoya-shi, Aichi-ken (JP)

(72) Inventor: Toyoshi Adachi, Kakamigahara (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 73 days.

(21) Appl. No.: 14/857,935

(22) Filed: Sep. 18, 2015

(65) Prior Publication Data

US 2016/0092146 A1    Mar. 31, 2016

(30) Foreign Application Priority Data

Sep. 30, 2014   (JP) ................ 2014-202139

(51) Int. Cl.
  *G06F 15/00* (2006.01)
  *G06F 3/12* (2006.01)
  *H04N 1/00* (2006.01)

(52) U.S. Cl.
  CPC .......... *G06F 3/1238* (2013.01); *G06F 3/1222* (2013.01); *H04N 1/00395* (2013.01); *H04N 1/00514* (2013.01); *H04N 1/00681* (2013.01); *H04N 2201/0094* (2013.01)

(58) Field of Classification Search
  CPC . G06F 3/1238; G06F 3/1222; H04N 1/00395; H04N 1/00514; H04N 1/00618
  USPC ......................................... 358/1.14
  See application file for complete search history.

(56) References Cited

U.S. PATENT DOCUMENTS

2010/0064343 A1* 3/2010 Konagaya ................ H04L 9/32
                                                              726/2
2014/0300927 A1* 10/2014 Kuroda ................ H04N 1/0097
                                                              358/1.15

FOREIGN PATENT DOCUMENTS

JP      9-292989 A    11/1997
JP      2004-164261 A  6/2004

* cited by examiner

*Primary Examiner* — Mark Milia
(74) *Attorney, Agent, or Firm* — Merchant & Gould P.C.

(57) ABSTRACT

An image processing apparatus including a reader, a storage configured to store identification information, one or more setting operations, and one or more pieces of state information in association with each other, each setting operation being a previously-set operation of operations executable by the image processing apparatus, each piece of the state information indicating a predetermined apparatus state of apparatus states in which the image processing apparatus is allowed to be, and a controller configured to control the reader to read the identification information from a recording medium, acquire particular state information indicating a particular apparatus state of the image processing apparatus, and when determining that the acquired particular state information is coincident with a specific piece of the state information, perform a particular operation of the one or more setting operations that is stored in the storage in association with the specific piece of the state information.

10 Claims, 9 Drawing Sheets

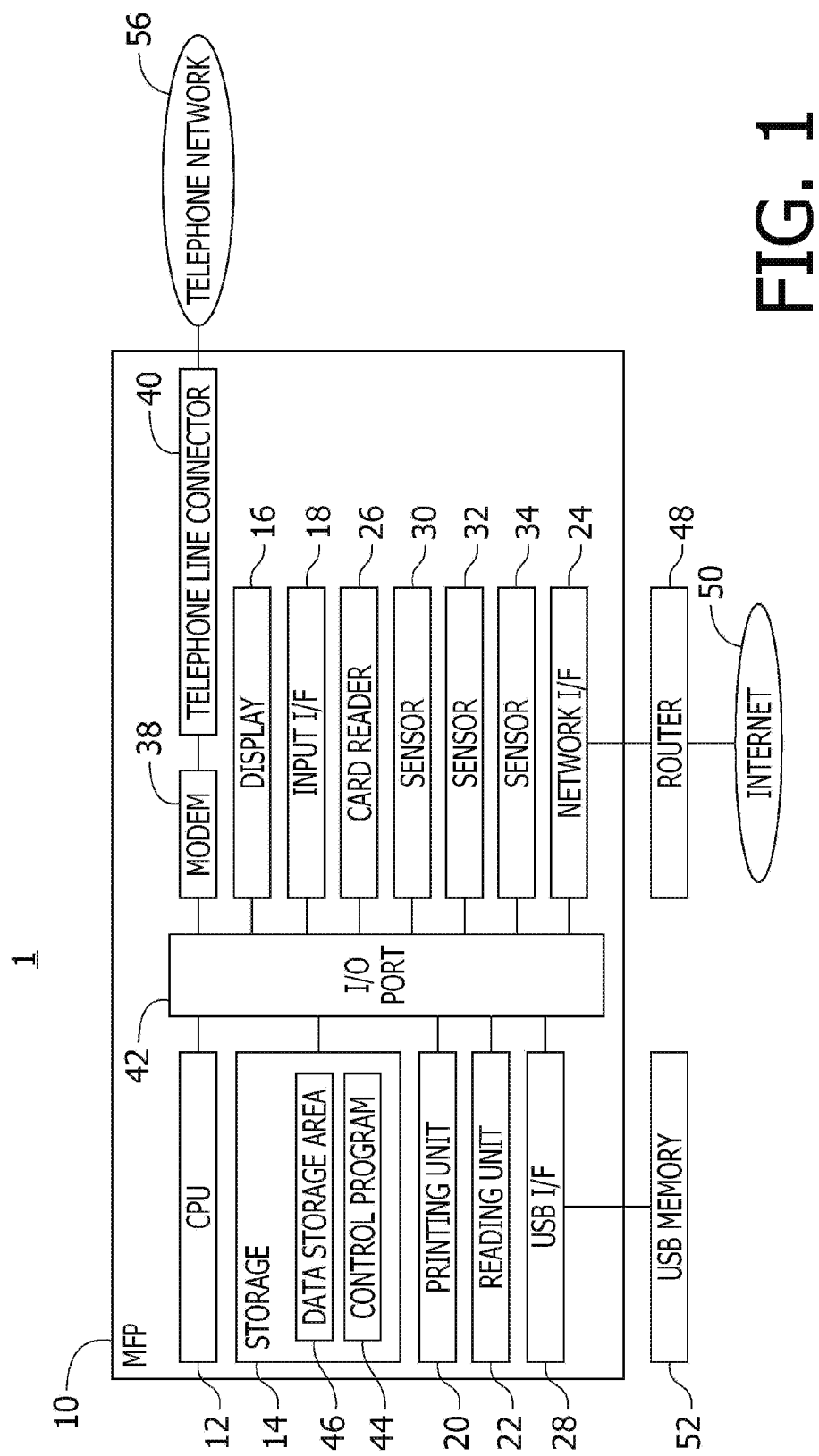

FIG. 2

| User Name (Account) | Card ID | Operation Restriction Profile | | | | | Shortcut Information | | | | | Folder | Address |
|---|---|---|---|---|---|---|---|---|---|---|---|---|---|
| | | Copy Operation | FAX Operation | Scanning Operation | Direct Print Operation | Internal Storage Print Operation | ADF Set Information | FB Set Information | USB Connection Information | MP Tray Set Information | ADF Set Information & USB Connection Information | | |
| inoue | AA | NG | OK | OK | OK | OK | 1 | 7 | 4 | - | 3 | \\server-A\inoue | inoue@email.com |
| adachi | BB | OK | OK | OK | OK | NG | 6 | 6 | 4 | - | 3 | \\server-A\adachi | adachi@email.com |
| kato | CC | NG | OK | OK | NG | OK | 2 | 2 | - | 5 | - | \\server-A\kato | kato@email.com |
| tommy | DD | NG | OK | OK | NG | OK | - | - | - | - | - | \\server-A\terry | terry@email.com |
| - | EE | - | - | - | - | - | 7 | 7 | - | - | - | - | - |

| Shortcut Information | Setting Operation | Operational Condition |
|---|---|---|
| 1 | Scanning Operation | Operation: Scan (ADF) to Folder<br>Storage Destination: Folder Linked with Account<br>Scanning Resolution: 300 dpi<br>Scanning Color: Color |
| 2 | Scanning Operation | Operation: Scan (ADF or FB) to Email<br>Transmission Destination: Email Address Linked with Account<br>Scanning Resolution: 200 dpi<br>Scanning Color: Color |

| Shortcut Information | Setting Operation | Operational Condition |
|---|---|---|
| 3 | Scanning Operation | Operation: Scan (ADF) to USB<br>Storage Destination: USB Memory<br>Scanning Resolution: 600 dpi<br>Scanning Color: Color |
| 4 | Direct Print Operation | Operation: Printing of File in USB Memory<br>Duplex: ON<br>Printing Color: Monochrome |

| Shortcut Information | Setting Operation | Operational Condition |
|---|---|---|
| 5 | Internal Storage Print Operation | Operation: Printing of Particular File in Internal Storage (MP Tray)<br>Duplex: OFF<br>Printing Color: Monochrome |
| 6 | Copy Operation | Operation: Copy (ADF or FB)<br>Duplex: OFF<br>Printing Color: Color |
| 7 | FAX Operation | Operation: FAX Transmission (Scan (ADF or Flatbed))<br>Transmission Destination: Representative Address of ○○ Office<br>Duplex: OFF<br>Printing Color: Monochrome |

IMAGE PROCESSING APPARATUS, AND METHOD AND COMPUTER-READABLE MEDIUM FOR THE SAME

CROSS-REFERENCE TO RELATED APPLICATION

This application claims priority under 35 U.S.C. §119 from Japanese Patent Application No. 2014-202139 filed on Sep. 30, 2014. The entire subject matter of the application is incorporated herein by reference.

BACKGROUND

Technical Field

The following description relates to one or more techniques for an image processing apparatus configured to read identification information stored in a recording medium.

Related Art

An image processing apparatus such as an image scanner and a printer has been known that is configured to execute various image processing operations using a recording medium such as a card having identification information recorded therein. Specifically, for instance, in a known image scanner, particular identification information and an instruction to execute a scanning operation are stored in association with each other. When the particular identification information is read out from the card by a card reader provided to the image scanner, the scanning operation is executed by the image scanner. Thus, by using a recording medium such as a card, it is possible to execute a particular operation without having to operate operable members such as keys and buttons and to simplify user operations.

SUMMARY

According to aspects of the present disclosure, an image processing apparatus is provided, which includes a reader configured to read, from a recording medium, identification information recorded in the recording medium, a storage configured to store the identification information, one or more setting operations, and one or more pieces of state information in association with each other, each setting operation being a previously-set operation of operations executable by the image processing apparatus, each piece of the state information indicating a predetermined apparatus state of apparatus states in which the image processing apparatus is allowed to be, and a controller configured to perform operations including controlling the reader to read the identification information from the recording medium, acquiring particular state information indicating a particular apparatus state of the image processing apparatus, determining whether the acquired particular state information is coincident with a specific piece of the state information stored in the storage in association with the identification information read by the reader, and when determining that the acquired particular state information is coincident with a specific piece of the state information, performing a particular operation of the one or more setting operations, the particular operation being stored in the storage in association with the specific piece of the state information.

According to aspects of the present disclosure, further provided is a method adapted to be implemented on one or more processors coupled with an image processing apparatus including a reader and a storage, the method including causing the reader to read identification information from a recording medium, the reader being configured to read, from the recording medium, the identification information recorded in the recording medium, acquiring particular state information indicating a particular apparatus state of the image processing apparatus, determining whether the acquired particular state information is coincident with a specific piece of state information stored in the storage in association with the identification information read by the reader, the storage being configured to store the identification information, one or more setting operations, and one or more pieces of state information in association with each other, each setting operation being a previously-set operation of operations executable by the image processing apparatus, each piece of the state information indicating a predetermined apparatus state of apparatus states in which the image processing apparatus is allowed to be, and when determining that the acquired particular state information is coincident with a specific piece of the state information, performing a particular operation of the one or more setting operations, the particular operation being stored in the storage in association with the specific piece of the state information.

According to aspects of the present disclosure, further provided is a non-transitory computer-readable medium storing computer-readable instructions that are executable by one or more processors coupled with an image processing apparatus including a reader and a storage, the instructions being configured to, when executed by the one or more processors, cause the one or more processors to perform operations including controlling the reader to read first identification information from a recording medium, the reader being configured to read, from the recording medium, the first identification information recorded in the recording medium, acquiring particular state information indicating a particular apparatus state of the image processing apparatus, determining whether the acquired particular state information is coincident with a specific piece of state information stored in the storage in association with the first identification information read by the reader, the storage being configured to store the first identification information, one or more setting operations, and one or more pieces of state information in association with each other, each setting operation being a previously-set operation of operations executable by the image processing apparatus, each piece of the state information indicating a predetermined apparatus state of apparatus states in which the image processing apparatus is allowed to be, and when determining that the acquired particular state information is coincident with a specific piece of the state information, performing a particular operation of the one or more setting operations, the particular operation being stored in the storage in association with the specific piece of the state information.

BRIEF DESCRIPTION OF THE ACCOMPANYING DRAWINGS

FIG. 1 is a block diagram schematically showing a configuration of a multi-function peripheral (hereinafter, which may be referred to as an "MFP") in accordance with one or more aspects of the present disclosure.

FIG. 2 shows a conceptual configuration of data stored in a data storage area of the MFP in accordance with one or more aspects of the present disclosure.

DETAILED DESCRIPTION

Figure 3:
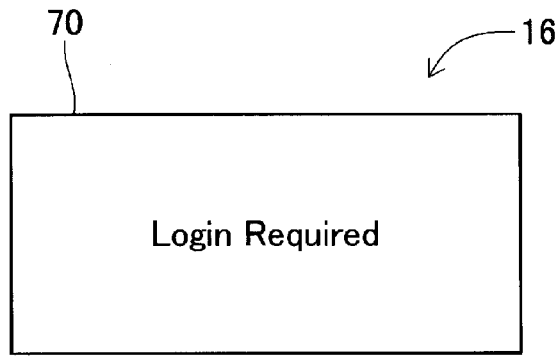
FIG. 3 shows a login request screen to be displayed on a display of the MFP in accordance with one or more aspects of the present disclosure.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

As described above, by using a recording medium such as a card, it is possible to simplify user operations for the known image processing apparatus such as an image scanner. As one of advantages obtained by using a recording medium such as a card, an advantage is cited that it is possible to execute a particular operation without having to operate operable members such as keys and buttons or with simplified operations of such operable members. However, when a particular one of a plurality of operations is executed using a single card, a user operation is required to select the particular operation from among the plurality of operations. Thus, in such a case, the advantage obtained by using the card might be impaired.

Aspects of the present disclosure are advantageous to provide one or more improved techniques, for an image processing apparatus, which make it possible to solve the aforementioned problem.

Hereinafter, an illustrative embodiment according to aspects of the present disclosure will be described with reference to the accompanying drawings.

<Configuration of Communication System>

FIG. 1 is a block diagram showing a configuration of a multi-function peripheral (hereinafter referred to as an "MFP" in an abbreviated form) 10 in the illustrative embodiment. The MFP 10 includes a central processing unit (hereinafter referred to as a "CPU" in an abbreviated form) 12, a storage 14, a display 16, an input interface (hereinafter, which may be referred to as an "input I/F") 18, a printing unit 20, a reading unit 22, a network interface (hereinafter, which may be referred to as a "network I/F") 24, a card reader 26, a USB interface (hereinafter, which may be referred to as a "USB I/F") 28, sensors 30, 32, and 34, a modem 38, and a telephone line connector 40. The elements included in the MFP 10 are communicably interconnected via an input/output port (hereinafter, which may be referred to as an "I/O port") 42.

The CPU 12 is configured to perform operations in accordance with a control program 44 stored in the storage 14. The control program 44 is configured to, when executed by the CPU 12, cause the CPU 12 to perform various operations of the MFP 10. It is noted that hereinafter, "the CPU 12 executing the control program 44" may be simply referred to as "the control program 44." For example, in the following description, "the control program 44" may denote "the CPU 12 executing the control program 44."

Further, the storage 14 includes a data storage area 46. The data storage area 46 is configured to store data necessary for executing the control program 44. The storage 14 may be configured with a combination of storage devices including a random access memory (hereinafter referred to as a "RAM" in an abbreviated form), a read-only memory (hereinafter referred to as a "ROM" in an abbreviated form), a flash memory, a hard disk drive (hereinafter referred to as an "HDD" in an abbreviated form), and a buffer of the CPU 12.

The display 16 includes a display surface configured to display thereon various functions of the MFP 10. As an example of the display 16, an LCD, an organic EL, and a plasma display may be cited. The input I/F 18 may be a touch panel that is formed integrally with the display 16 and configured to accept user operations to buttons displayed on the display 16. Alternatively, the input I/F 18 may be hard keys.

The printing unit 20 includes a printing mechanism. For instance, an inkjet head may be cited as an example of the printing mechanism of the printing unit 20. The inkjet head may be a thermal inkjet head or a piezoelectric inkjet head. In this case, when receiving drive signals from the CPU 12, the inkjet head discharges ink droplets from its nozzles in accordance with the received drive signals. Thereby, the MFP 10 is allowed to perform printing on a sheet placed on a feed tray (not shown) or a multi-purpose tray (not shown, hereinafter referred to as an "MP tray"). The feed tray is disposed inside a housing of the MFP 10. The MP tray is configured to support a printing sheet in such a manner that at least a part of the printing sheet is exposed out of the housing of the MFP 10.

The reading unit 22 is configured to read an image and generate scanned data of the read image. As an example of the reading unit 22, a CCD image sensor and a contact image sensor may be cited. Thereby, the MFP 10 is allowed to perform an operation of scanning a document placed on an automatic document feeder (not shown, hereinafter referred to as an "ADF") or a flatbed (not shown).

The network I/F 24 is connected with an Internet 50 via a router 48. The network I/F 24 is configured to perform data communication with external devices. The card reader 26 is configured to, when a card (not shown) with an IC chip embedded therein is brought in proximity to or in contact with the card reader 26, read a card ID stored in the IC chip via near-field wireless communication. The USB I/F 28 is configured to removably connect with an external storage device (i.e., a USB memory 52). Thereby, the MFP 10 is allowed to store image data in the USB memory 52. Further, when the USB memory 52 is attached to or detached from the USB I/F 28, a detection voltage of the USB I/F 28 changes. The CPU 12 is allowed to detect attachment/detachment of the USB memory 52 based on the change in the detection voltage.

The sensor 30 is a known optical sensor configured to detect whether there is a document set on the ADF. The sensor 32 is a known optical sensor configured to detect whether there is a document set on the flatbed. The sensor 34 is a known optical sensor configured to detect whether there is a printing sheet set on the MP tray. Based on output signals from the sensors 30, 32, and 34, and the detection voltage of the USB I/F 18, the MFP 10 is allowed to detect apparatus states. The apparatus states include whether there is a document set on the ADF, whether there is a document set on the flatbed, whether there is a document set on the MP tray, and whether the USB memory 52 is connected with the USB I/F 28. It is noted that information indicating the apparatus states detected based on the output signals from the sensors 30, 32, and 34, and the detection voltage of the USB I/F 18 may hereinafter be referred to as "detection state information."

The modem 38 is configured to modulate image data to be transmitted by a facsimile function into signals transmittable via a telephone network 56, and transmit the modulated signals via the telephone line connector 40. Further, the modem 38 is configured to receive signals from the telephone network 56 via the telephone line connector 40, and demodulate the received signals into image data. Thereby, the MFP 10 is allowed to perform facsimile transmission and facsimile reception.

<Various Operation by MFP Using Card>

In response to the card being brought in proximity to or in contact with the card reader 26, the MFP 10 performs user authentication. Specifically, before the user authentication, the MFP 10 is in a logout state. At this time, as shown in FIG. 3, a login request screen 70 is displayed on the display of the MFP 10. The login request screen 70 is a screen image displayed in a state where the MFP 10 is waiting for login. When the login request screen 70 is being displayed, the MFP 10 is in the logout state. When the card is brought in proximity to or in contact with the card reader 26, the card ID of the card is read by the card reader 26.

Figure 4:
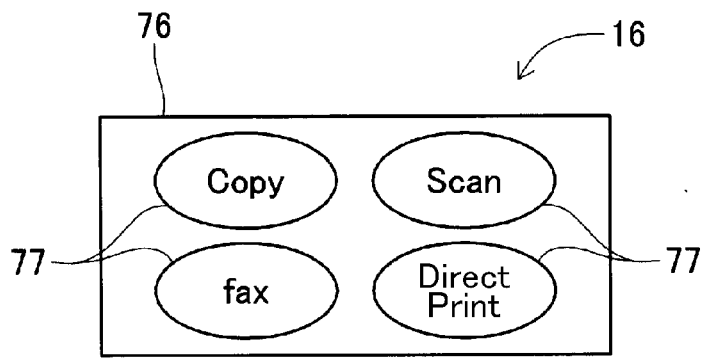
FIG. 4 shows a login screen to be displayed on the display of the MFP in accordance with one or more aspects of the present disclosure.

When the card ID is read, it is determined whether the read card ID is user-registered ID. Specifically, as shown in FIG. 2, in the data storage area 46 of the MFP 10, card IDs and user names are stored in association with each other. Then, it is determined whether the read card ID is associated with a user name. When it is determined whether the read card ID is associated with a user name, the MFP 10 is brought into a login state. When the MFP 10 is in the login state, as shown in FIG. 4, a login screen 76 is displayed on the display 16. Meanwhile, when it is determined whether the read card ID is not associated with any user name, or when the read card ID is not stored in the data storage area 46, a request for login is rejected. In this case, the login screen 76 is not displayed.

When the MFP 10 is brought into the login state, and a particular one of a plurality of function buttons 77 displayed on the login screen 76 is operated, an operation corresponding to the operated button is executed. In this regard, nonetheless, in the MFP 10, operations actually executable by the MFP 10 are restricted to operations specific to each card. Namely, actually-executable operations by the MFP 10 differ depending on each user.

Figure 5:
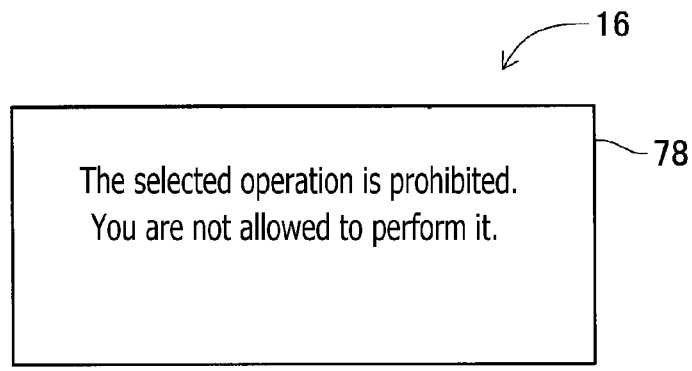
FIG. 5 shows an operation restriction screen to be displayed on the display of the MFP in accordance with one or more aspects of the present disclosure.

Specifically, as shown in FIG. 2, in the data storage area 46, the card IDs and operation restriction profiles are stored in association with each other. Each operation restriction profile is information identifying one or more prohibited operations among operations inherently executable by the MFP 10. Specifically, for instance, in an operation restriction profile stored in association with a card ID "AA," a copy operation is prohibited. Namely, when the MFP 10 is brought into the login state by use of the card with the card ID "AA" recorded therein, the copy operation is prohibited. Therefore, a user of the card with the card ID "AA" recorded therein is not allowed to perform the copy operation with the MFP 10. Further, when a function button 77 for performing the copy operation is operated on the login screen 76, as shown in FIG. 5, an operation restriction screen 78 is displayed on the display 16. On the operation restriction screen 78, a message informing that the selected operation is prohibited is displayed. In the operation restriction profile stored in association with the card ID "AA," the operations other than the copy operation are not prohibited. Therefore, the user of the card with the card ID "AA" recorded therein is allowed to perform the other operations such as the scanning operation, a facsimile operation, a direct print operation, and an internal storage print operation.

In an operation restriction profile stored in association with a card ID "BB," the internal storage print operation is prohibited. In an operation restriction profile stored in association with a card ID "CC," the copy operation and the direct print operation are prohibited. In an operation restriction profile stored in association with a card ID "DD," the copy operation and the direct print operation are prohibited. A user of each card is not allowed to perform one or more prohibited operations identified by the operation restriction profile associated with the corresponding card ID. Further, when a function button 77 for performing a prohibited operation is operated on the login screen 76, the operation restriction screen 78 is displayed on the display 16.

In the MFP 10, in a case where the MFP 10 is in a predetermined state when the card is brought in proximity to or in contact with the card reader 26, it is possible to perform a particular operation with the MFP 10 by using a shortcut function. Specifically, when the card ID is read by the card reader 26, an apparatus state is detected based on output signals from the sensors 30, 32, and 34 and the detection voltage of the USB I/F 28. Thereby, the detection state information is obtained. In the meantime, as shown in FIG. 2, in the data storage area 46, the card ID and shortcut information are stored in association with each other. The shortcut information is linked with a particular operation (hereinafter, which may be referred to as a "setting operation") by the MFP 10 and information indicating the apparatus state (hereinafter, which may be referred to as "shortcut state information" to distinguish it from the detection state information). It is determined whether the detection state information obtained by detecting the output signals from the sensors 30, 32, and 34 and the detection voltage of the USB I/F 28 is coincident with the shortcut state information of the shortcut information associated with the detected card ID. At this time, when the detection state information is coincident with the shortcut state information, the setting operation linked with the shortcut state information is performed.

For instance, the card ID "AA" is stored in association with shortcut information "1," "3," "4," and "7." In the shortcut information "1," ADF set information as the shortcut state information is linked with the scanning operation as the setting operation. The ADF set information indicates that a document is set on the ADF of the MFP 10. In the shortcut information "3," a combination of the ADF set information and USB connection information as the shortcut state information is linked with the scanning operation as the setting operation. The USB set information indicates that the USB memory 52 is connected with the USB I/F 28. The ADF set information indicates that a document is set on the ADF of the MFP 10. In the shortcut information "4," the USB connection information as the shortcut state information is linked with the direct print operation as the setting operation. In the shortcut information "7," FB set information as the shortcut state information is linked with the facsimile operation as the setting operation. The FB set information indicates that a document is set on the flatbed of the MFP 10.

Thus, in the data storage area 46, the card ID "AA" and the shortcut information are stored in association with each other. The shortcut function using the card with the card ID "AA" recorded therein will be described below. When the shortcut function using the card is used, the MFP 10 is in the logout state, and the login request screen 70 is displayed on the display 16. Then, in response to the card with the card ID "AA" recorded therein being brought in proximity to or in contact with the card reader 26, the card reader reads the card ID "AA." When the card ID "AA" is read by the card reader 26, the apparatus state is detected based on the output signals from the sensors 30, 32, and 34 and the detection voltage of the USB OF 28. Thereby, the detection state information is obtained. At this time, for instance, when a document is set on the ADF, information indicating that a document is set on the ADF is obtained as the detection state information.

When the card ID "AA" is read by the card reader 26, the shortcut state information is extracted from the shortcut information stored in the data storage area 46 in association with the card ID "AA." Namely, from the shortcut information "1," "3," "4," and "7," the ADF set information, the FB set information, the USB connection information, and the combination of the ADF set information and the USB connection information are extracted. Then, it is determined whether the detection state information (i.e., (the information indicating that a document is set on the ADF) is contained in the extracted shortcut state information. At this time, in the shortcut information "1," the ADF set information is stored as the shortcut state information. Therefore, it is determined that the detection state information is contained in the shortcut state information.

Figure 6:
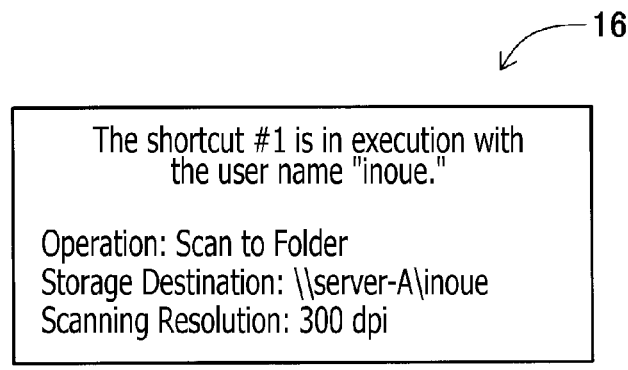
FIG. 6 shows a screen on which information on an operation in execution is displayed, in accordance with one or more aspects of the present disclosure.

When it is determined that the detection state information is contained in the shortcut state information, the setting operation is performed that is linked with the shortcut state information (i.e., the ADF set information) identical to the detection state information. Specifically, in the shortcut information "1," the ADF set information is linked with the scanning operation. Hence, the scanning operation is performed. The scanning operation for the shortcut information "1" is performed in accordance with operational conditions for the shortcut information "1" shown in FIG. 2. The scanning operation for the document set on the ADF is performed in accordance with the conditions such as Scanning Resolution "300 dpi" and Scanning Color "color." Scanned data generated by the scanning operation is stored into a folder set for the card ID "AA." When the scanning operation for the shortcut information "1" is being executed, information on the scanning operation in execution is displayed on the display 16, as shown in FIG. 6.

In a case where a document is set on the flatbed before the card ID "AA" is read by the card reader 26, when the apparatus state is detected based on the output signals from the sensors 30, 32, and 34 and the detection voltage of the USB I/F 28, information indicating that a document is set on the flatbed is obtained as the detection state information. In the shortcut information "7," the FB set information is stored as the shortcut state information. Therefore, it is determined that the detection state information is contained in the shortcut state information. In the MFP 10, the facsimile operation is performed that is linked with the FB set information in the shortcut information "7." The facsimile operation for the shortcut information "7" is performed in accordance with operational conditions for the shortcut information "7" shown in FIG. 2. Namely, the scanning operation for the document set on the flatbed is performed in accordance with the conditions such as Duplex "OFF" and Scanning Color "monochrome." Scanned data generated by the scanning operation is transmitted via facsimile to the representative address of the ○○ office. When the facsimile operation for the shortcut information "7" is being executed, information on the facsimile operation in execution is displayed on the display 16.

In a case where the USB memory 52 is connected with the USB I/F 28 before the card ID "AA" is read by the card reader 26, when the apparatus state is detected based on the output signals from the sensors 30, 32, and 34 and the detection voltage of the USB I/F 28, information indicating that the USB memory 52 is connected with the USB OF 28 is obtained as the detection state information. In the shortcut information "4," the USB connection information is stored as the shortcut state information. Therefore, it is determined that the detection state information is contained in the shortcut state information. In the MFP 10, the direct print operation is performed that is linked with the USB connection information in the shortcut information "4." The direct print operation for the shortcut information "4" is performed in accordance with operational conditions for the shortcut information "4" shown in FIG. 2. Namely, the direct print operation based on image data stored in the USB memory 52 is performed in accordance with the conditions such as Duplex "ON" and Printing Color "monochrome." In the direct print operation, printing sheets placed on the feed tray are used. When the direct print operation for the shortcut information "4" is being executed, information on the direct print operation in execution is displayed on the display 16.

In a case where the USB memory 52 is connected with the USB I/F 28, and a document is set on the ADF before the card ID "AA" is read by the card reader 26, when the apparatus state is detected based on the output signals from the sensors 30, 32, and 34 and the detection voltage of the USB I/F 28, information indicating that the USB memory 52 is connected with the USB I/F 28 and information indicating that a document is set on the ADF are obtained as the detection state information. In the shortcut information "3," the ADF set information and the USB connection information are stored as the shortcut state information. Therefore, it is determined that the detection state information is contained in the shortcut state information. Therefore, in the MFP 10, the scanning operation is performed that is linked with the combination of the ADF set information and the USB connection information in the shortcut information "3." The scanning operation for the shortcut information "3" is performed in accordance with operational conditions for the shortcut information "3" shown in FIG. 2. Namely, the scanning operation for the document set on the ADF is performed in accordance with the conditions such as Scanning Resolution "600 dpi" and Scanning Color "color." Scanned data generated by the scanning operation is stored into the USB memory 52. When the scanning operation for the shortcut information "3" is being executed, information on the scanning operation in execution is displayed on the display 16.

The card ID "BB" is stored in association with shortcut information "3," "4," and "6." In the shortcut information "6," one of the ADF set information and the FB set information as the shortcut state information is linked with the copy operation as the setting operation. Further, the shortcut information "3" and "4" associated with the card ID "BB"

are the same as the shortcut information "3" and "4" associated with the card ID "AA," respectively. Therefore, in the following description about the shortcut function using the card ID "BB," an explanation on the shortcut information "3" and "4" will be omitted. Thus, in the data storage area 46, the card ID "BB" and the shortcut information are stored in association with each other.

When the card ID "BB" is read by the card reader 26, the apparatus state is detected based on the output signals from the sensors 30, 32, and 34 and the detection voltage of the USB I/F 28. For instance, when a document is set on the ADF or the flatbed, information indicating that a document is set on the ADF or the flatbed is obtained as the detection state information.

When the card ID "BB" is read by the card reader 26, the shortcut state information is extracted from the shortcut information stored in the data storage area 46 in association with the card ID "BB." From the shortcut information "3," "4," and "6" stored in association with the card ID "BB," the ADF set information, the FB set information, the USB connection information, and the combination of the ADF set information and the USB connection information are extracted. It is determined whether the detection state information, i.e., the information indicating that a document is set on the ADF or the flatbed is contained in the extracted shortcut state information. In the shortcut information "6," the ADF set information and the FB set information are stored as the shortcut state information. Therefore, it is determined that the detection state information is contained in the shortcut state information.

When it is determined that the detection state information is contained in the shortcut state information, the setting operation is performed that is linked with the shortcut state information (i.e., one of the ADF set information and the FB set information) identical to the detection state information. Specifically, the copy operation is performed that is linked with one of the ADF set information and the FB set information in the shortcut information "6." The copy operation is performed in accordance with operational conditions for the shortcut information "6" shown in FIG. 2. The scanning operation is performed for the document set on the ADF or the flatbed. A printing operation based on scanned data generated by the scanning operation is performed in accordance with the conditions such as Duplex "OFF" and Printing Color "color." In the copy operation, printing sheets placed on the feed tray are used. When the copy operation for the shortcut information "6" is being executed, information on the copy operation in execution is displayed on the display 16.

The card ID "CC" is stored in association with the shortcut information "2" and the shortcut information "5." In the shortcut information "2," one of the ADF set information and the FB set information as the shortcut state information is linked with the scanning operation as the setting operation. In the shortcut information "5," MP tray set information as the shortcut state information is linked with the internal storage print operation as the setting operation. The MP tray set information indicates that a printing sheet is set on the MP tray. Thus, in the data storage area 46, the card ID "CC" and the shortcut information are stored in association with each other.

When the card ID "CC" is read by the card reader 26, the apparatus state is detected based on the output signals from the sensors 30, 32, and 34 and the detection voltage of the USB I/F 28. At this time, for instance, when a document is set on the ADF or the flatbed, information indicating that a document is set on the ADF or the flatbed is obtained as the detection state information.

When the card ID "CC" is read by the card reader 26, the shortcut state information is extracted from the shortcut information stored in the data storage area 46 in association with the card ID "CC." From the shortcut information "2" and "5" stored in association with the card ID "CC," the ADF set information, the FB set information, and the MP tray set information are extracted. It is determined whether the detection state information (i.e., the information indicating that a document is set on the ADF or the flatbed) is contained in the extracted shortcut state information. In the shortcut information "2," the ADF set information and the FB set information are stored as the shortcut state information. Therefore, it is determined that the detection state information is contained in the extracted shortcut state information.

When it is determined that the detection state information is contained in the shortcut state information, the setting operation is performed that is linked with the shortcut state information (i.e., the ADF set information or the FB set information) identical to the detection state information. Specifically, the scanning operation is performed that is linked with one of the ADF set information and the FB set information in the shortcut information "2." The scanning operation is performed in accordance with operational conditions for the shortcut information "2" shown in FIG. 2. The scanning operation is performed for the document set on the ADF or the flatbed in accordance with the conditions such as Scanning Resolution "200 dpi" and Scanning Color "color." Scanned data generated by the scanning operation is transmitted via email to an address set for the card ID "CC." When the scanning operation for the shortcut information "2" is being executed, information on the scanning operation in execution is displayed on the display 16.

When a printing sheet is set on the MP tray before the card ID "CC" is read by the card reader 26, information indicating that a printing sheet is set on the MP tray is obtained based on the output signals from the sensors 30, 32, and 34 and the detection voltage of the USB I/F 28. In this case, when it is determined whether the detection state information is contained in the shortcut state information, since the MP tray set information is stored as the shortcut state information in the shortcut information "5," it is determined that the detection state information is contained in the shortcut state information. In the MFP 10, the internal storage print operation is performed that is linked with the MP tray set information in the shortcut information "5." The internal storage print operation is performed in accordance with operational conditions for the shortcut information "5" shown in FIG. 2. Namely, a printing operation based on image data stored in a particular file in the data storage area 46 is performed in accordance with the conditions such as Duplex "OFF" and Printing Color "monochrome." In the internal storage print operation, printing sheets set on the MP tray are used. When the internal storage print operation for the shortcut information "5" is being executed, information on the internal storage print operation in execution is displayed on the display 16.

The card ID "EE" is stored in association with the shortcut information "7." In the shortcut information "7," one of the ADF set information and the FB set information as the shortcut state information is linked with the facsimile operation as the setting operation. Thus, in the data storage area 46, the card ID "EE" and the shortcut information are stored in association with each other.

When the card ID "EE" is read by the card reader 26, the apparatus state is detected based on the output signals from the sensors 30, 32, and 34 and the detection voltage of the USB I/F 28. For instance, when a document is set on the ADF or the flatbed, information indicating that a document is set on the ADF or the flatbed is obtained as the detection state information.

When the card ID "EE" is read by the card reader, the shortcut state information is extracted from the shortcut information stored in the data storage area 46 in association with the card ID "EE." From the shortcut information "7" stored in association with the card ID "EE," the ADF set information and the FB set information are extracted. It is determined whether the detection state information (i.e., the information indicating that a document is set on the ADF or the flatbed) is contained in the extracted shortcut state information. In the shortcut information "7," the ADF set information and the FB set information are stored as the shortcut state information. Therefore, it is determined that the detection state information is contained in the extracted shortcut state information.

When it is determined that the detection state information is contained in the extracted shortcut state information, the setting operation is performed that is linked with the shortcut state information (i.e., the ADF set information or the FB set information) identical to the detection state information. Specifically, the facsimile operation is performed that is linked with one of the ADF set information and the FB set information in the shortcut information "7." Since the facsimile operation is the same as the facsimile operation to be executed using the card with the card ID "AA" recorded therein, an explanation of the facsimile operation will be omitted.

The MFP 10 is very user-friendly in that the user is allowed to, only by bringing the card in proximity to or in contact with the card reader 26, perform a particular one of the various operations without having to operate any operable button. According to the MFP 10, the user is allowed to, by using the card, perform a particular operation, of the various operations, corresponding to the state of the MFP 10. For instance, when the card is brought in proximity to or in contact with the card reader 26 in a state where a document is set on the ADF, the document set on the ADF is scanned. For instance, when the card is brought in proximity to or in contact with the card reader 26 in a state where the USB memory 52 is connected with the USB I/F 28, the direct print operation based on the image data stored in the USB memory 52 is performed. When the card is brought in proximity to or in contact with the card reader 26 in a state where a preparation is made for execution of a user-desired operation with the MFP 10, the user-desired operation is performed. Thereby, by the shortcut function using the card, it is possible to perform various operations. In the illustrative embodiment, nonetheless, since the card ID "DD" is not associated with any shortcut information, it is not possible to perform any operations by the shortcut function using the card with the card ID "DD" recorded therein.

The operation to be executed using the shortcut function, that is, the setting operation associated with the card ID is not prohibited by the operation restriction profile. The user is not allowed to perform an operation that is prohibited when the user logs in to the MFP 10, using the shortcut function. Specifically, for instance, with respect to the card with the card ID "AA" recorded therein, the copy operation is prohibited when the user logs in to the MFP 10 using the card, and the shortcut information associated with the card ID "AA" does not contain the copy operation. Therefore, the user is not allowed to perform the copy operation using the shortcut function with the card in which the card ID "AA" recorded. Thereby, it is possible to prevent use of the shortcut function beyond authority granted to the user when the user logs in to the MFP 10.

Figure 7:
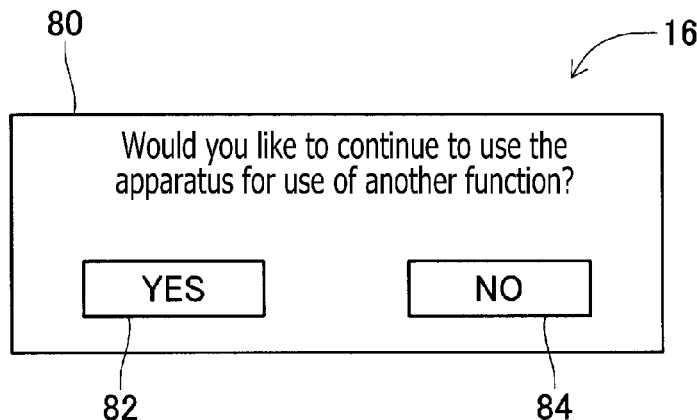
FIG. 7 shows a first inquiry screen to be displayed on the display of the MFP in accordance with one or more aspects of the present disclosure.

When various operations using the shortcut function with the card are completed, as shown in FIG. 7, a first inquiry screen 80 is displayed on the display 16. On the first inquiry screen 80, a YES button 82 and a NO button 84 are displayed. The YES button 82 is operated when the user wants to continue to use the MFP 10. When the YES button 82 is operated, the login screen 76 is displayed on the display 16. When the YES button 82 is operated on the first inquiry screen 80, the MFP 10 is brought into the login state, and the user is allowed to continue to use the MFP 10. Actually-executable operations that the user is allowed to execute with the MFP 10 in the login state are, as described above, restricted by the operation restriction profile. The NO button 84 is operated when the user wants to finish using the MFP 10. When the NO button 84 is operated, the login request screen 70 is displayed on the display 16. Namely, when the NO button 84 is operated on the first inquiry screen 80, the MFP 10 is brought into the logout state.

As described above, the card ID "EE" is not associated with any user name. Therefore, it is not possible to log in to the MFP 10 using the card with the card ID "EE" recorded therein. When various operations using the shortcut function with the card in which the card ID "EE" recorded therein are completed, the first inquiry screen 80 is not displayed on the display 16, but the login request screen 70 is displayed. The card with the card ID "EE" recorded therein is a card specifically for execution of operations using the shortcut function.

In the MFP 10, a second user, different from a first user who is using the MFP 10, is allowed to perform various operations using the shortcut function by bringing a card in proximity to or in contact with the card reader 26 when the first user is using the MFP 10. For instance, when a user B brings a card of the user B in proximity to or in contact with the card reader 26 while a user A is logging in to the MFP 10 using a card of the user A, the login state for the user A is temporarily put on hold, various operations using the shortcut function are performed according to the card of the user B. The user B is allowed to use the MFP 10 without having to wait for the user A to finish using the MFP 10.

Figure 8:
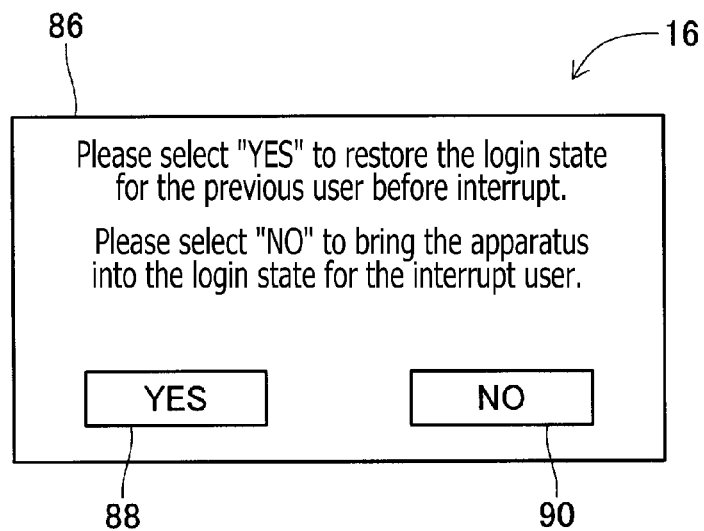
FIG. 8 shows a second inquiry screen to be displayed on the display of the MFP in accordance with one or more aspects of the present disclosure.

When the operation by the user B using the shortcut function is completed, as shown in FIG. 8, a second inquiry screen 86 is displayed on the display 16. On the second inquiry screen 86, a YES button 88 and a NO button 90 are displayed. The YES button 88 is operated when the previous user (e.g., the user A) wants to use the MFP 10. When the YES button 88 is operated, the login state for the user A, which is temporarily put on hold, is restored. When the YES button 88 is operated on the second inquiry screen 86, the user A is allowed to continue to use the MFP 10. The NO button 90 is operated when the interrupt user (e.g., the user B) wants to use the MFP 10. When the NO button 90 is operated, the login state for the user A, which is temporarily put on hold, is changed to the logout state. Instead, the MFP 10 is brought into a login state according to the card of the user B. When the NO button 90 is operated on the second inquiry screen 86, the user B is allowed to continue to use the MFP 10.

The MFP 10 is provided with a logout button (not shown). When the logout button is operated in a state where the MFP 10 is in the login state, the MFP 10 is brought into the logout state from the login state. Further, when none of various buttons is operated for a particular period of time in the state where the MFP 10 is in the login state, the MFP 10 is brought into the logout state from the login state.

<Control Program>

The aforementioned various operations by the MFP 10 are performed when the control program 44 is executed by the CPU 12 of the MFP 10. Hereinafter, referring to FIGS. 9 to 13, an explanation will be provided of a procedure of a process to be performed when the control program 44 is executed by the CPU 12 of the MFP 10.

Figure 10:
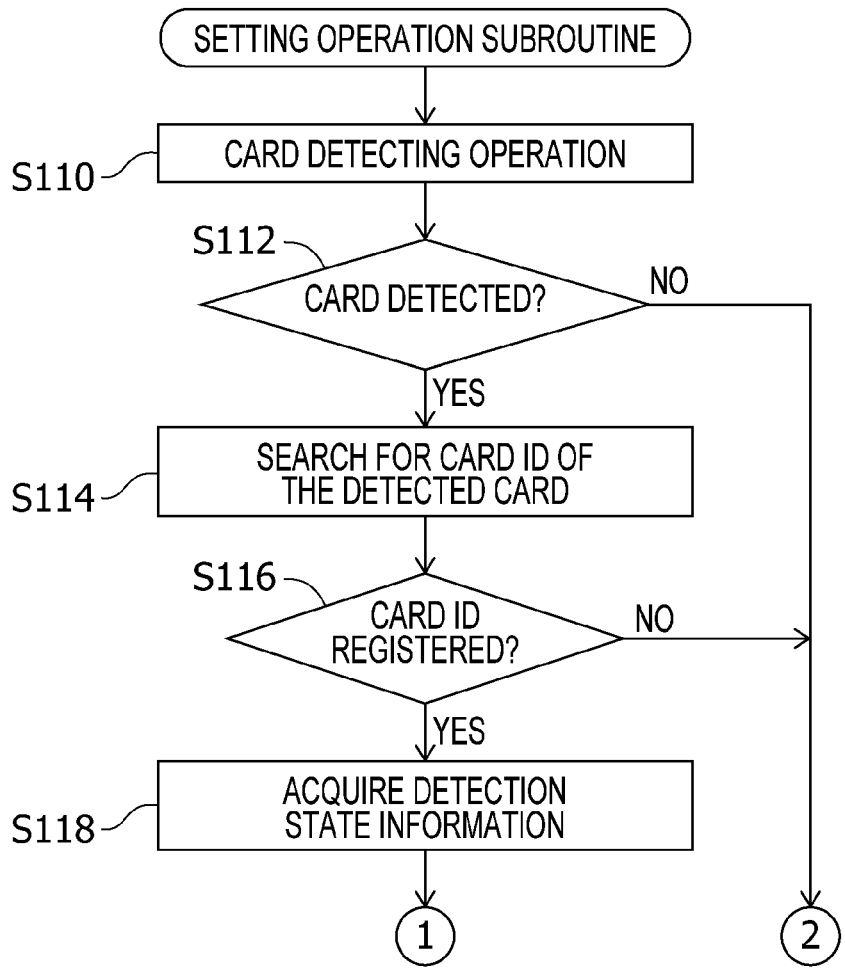
Figure 11:
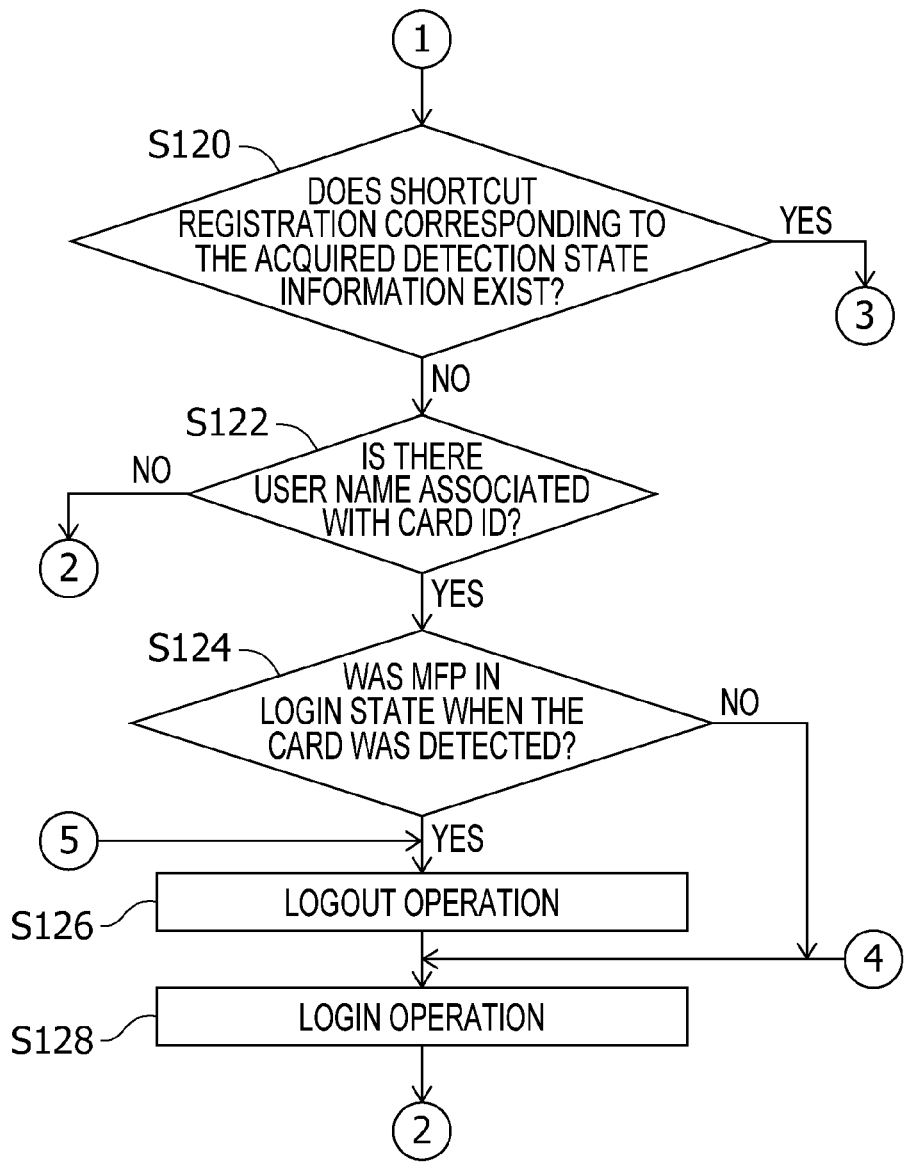
Figure 12:
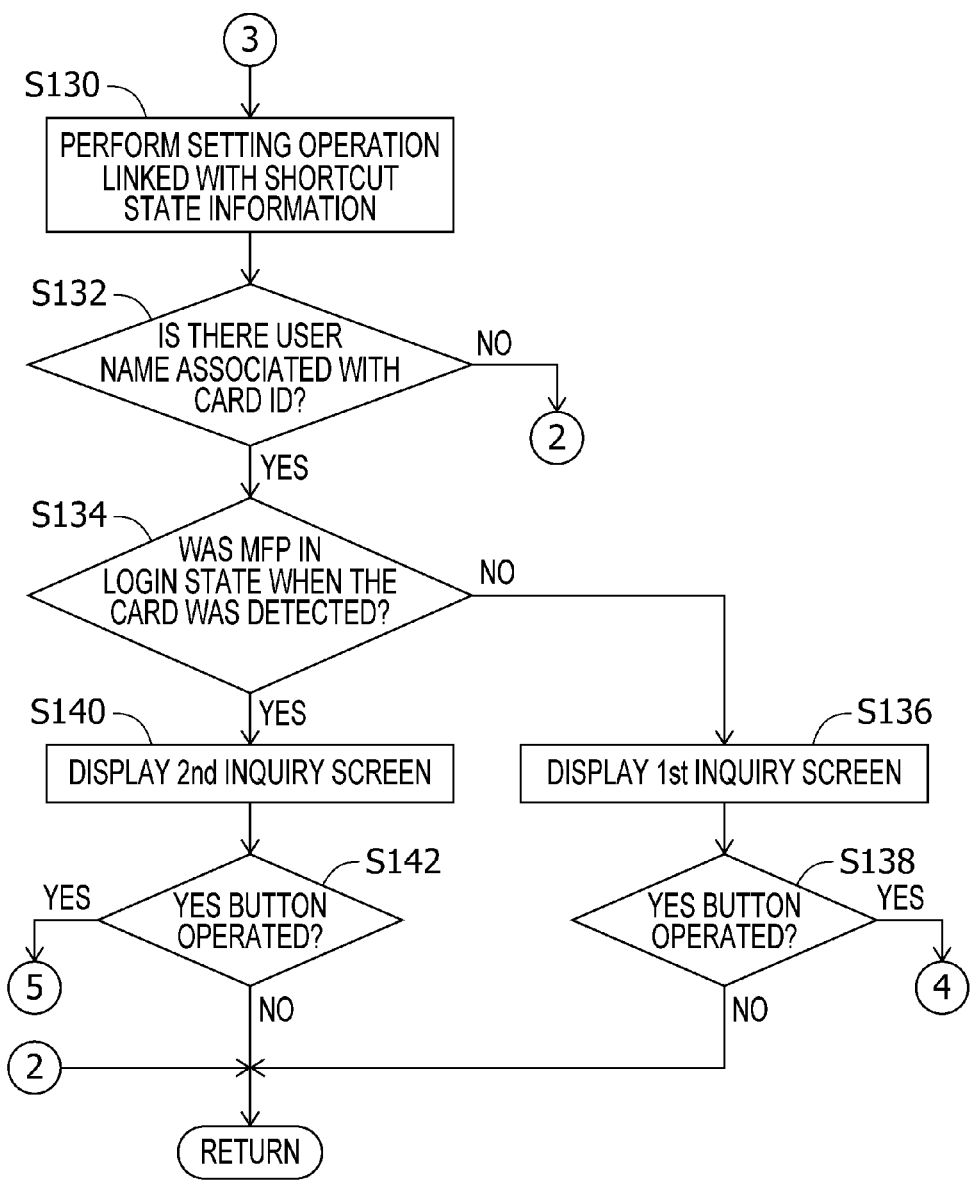

When the MFP 10 is powered on, the CPU 12 executes the control program 44 and performs a logout operation (S100). Namely, when powered on, the MFP 10 is in the logout state. The CPU 12 performs a setting operation subroutine (S102). In the setting operation subroutine, as shown in FIG. 10, the CPU 12 performs a card detecting operation with the card reader 26 (S110). Then, the CPU 12 determines whether there is a card detected in the card detecting operation (S112).

When determining that there is a card detected in the card detecting operation (S112: Yes), the CPU 12 controls the card reader 26 to read a card ID of the detected card, and searches for the read card ID in the data storage area 46 (S114). Then, the CPU 12 determines whether the card ID is registered in the data storage area 46, through the search for the card ID (S116). When determining that the card ID is registered (S116: Yes), the CPU 12 acquires detection state information based on output signals from the sensors 30, 32, and 34, and a detection voltage of the USB I/F 28 (S118).

The CPU 12 determines whether a shortcut registration corresponding to the acquired detection state information exists (S120). Namely, the CPU 12 extracts shortcut state information of shortcut information associated with the card ID, and determines whether the detection state information is contained in the extracted shortcut state information. When determining that a shortcut registration corresponding to the acquired detection state information does not exist (S120: No), that is, when the detection state information is not contained in the shortcut state information, the CPU 12 determines whether there is a user name associated with the card ID (S122).

When determining that there is a user name associated with the card ID (S122: Yes), the CPU 12 determines whether the MFP 10 was in the login state when the card was detected (S124). When determining that the MFP 10 was in the login state when the card was detected (S124: Yes), the CPU 12 performs a logout operation (S126). Thereafter, the CPU 12 goes to S128. Meanwhile, when determining that the MFP 10 was not in the login state when the card was detected (S124: No), the CPU 12 goes to S128 without executing the logout operation in S126. In S128, the CPU 12 performs a login operation corresponding to the detected card (S128). Thereafter, the CPU 12 terminates the setting operation subroutine.

When determining in S120 that a shortcut registration corresponding to the acquired detection state information exists (S120: Yes), that is, when the detection state information is contained in the shortcut state information, the CPU 12 performs a setting operation linked with the shortcut state information (S130). The CPU 12 determines whether there is a user name associated with the card ID (S132). When determining that there is a user name associated with the card ID (S132: Yes), the CPU 12 determines whether the MFP 10 was in the login state when the card was detected (S134).

When determining that the MFP 10 was not in the login state when the card was detected (S134: No), the CPU 12 controls the display 16 to display the first inquiry screen 80 (S136). The CPU 12 determines whether the YES button 82 has been operated on the first inquiry screen 80 (S138). When determining that the YES button 82 has been operated on the first inquiry screen 80 (S138: Yes), the CPU 12 performs the login operation in S128 and operations in the subsequent steps. Meanwhile, when determining that the NO button 84 has been operated on the first inquiry screen 80 (S138: No), the CPU 12 terminates the setting operation subroutine.

When determining that the MFP 10 was in the login state when the card was detected (S134: Yes), the CPU 12 controls the display 16 to display the second inquiry screen 86 (S140). The CPU 12 determines whether the YES button 88 has been operated on the second inquiry screen 86 (S142). When determining that the YES button 88 has been operated on the second inquiry screen 86 (S142: Yes), the CPU 12 performs the logout operation in S126 and operations in the subsequent steps. Meanwhile, when determining that the NO button 90 has been operated on the second inquiry screen 86 (S142: No), the CPU 12 terminates the setting operation subroutine.

The setting operation subroutine is also terminated in one of a case where it is determined in S112 that there is not a card detected in the card detecting operation (S112: No), a case where it is determined in S116 that the card ID is not registered (S116: No), a case where it is determined in S122 that there is not a user name associated with the card ID (S122: No), and a case where it is determined in S132 that there is not a user name associated with the card ID (S132: No).

Figure 9:
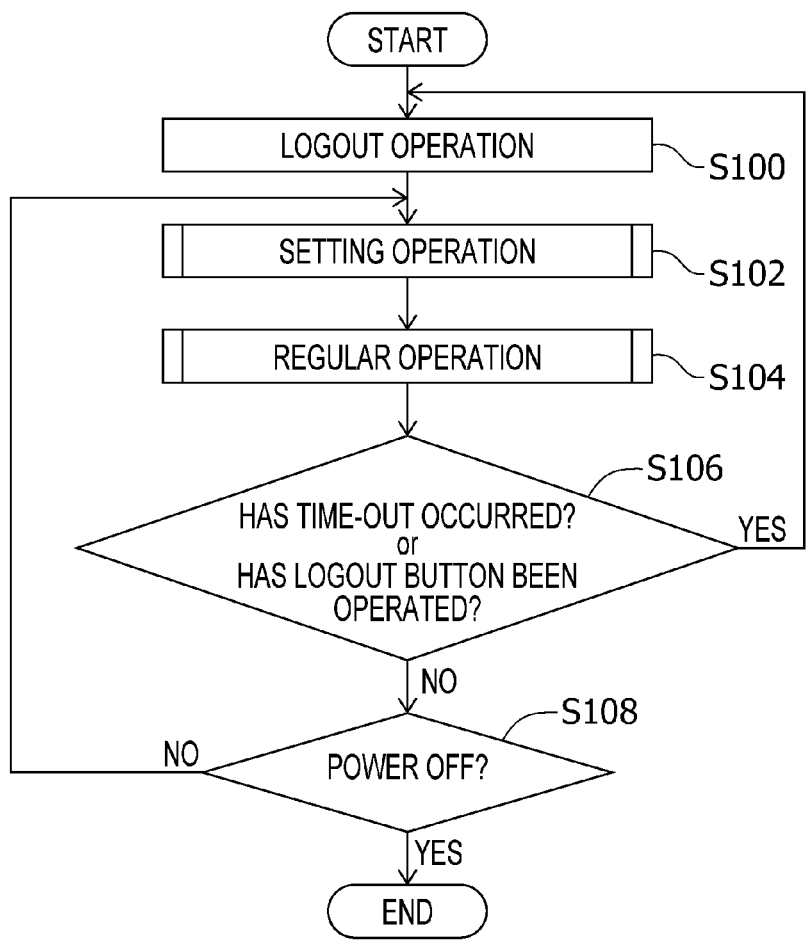
FIGS. 9 to 13 are flowcharts showing a procedure of a process to be performed when a control program is executed by a CPU of the MFP in accordance with one or more aspects of the present disclosure.
Figure 13:
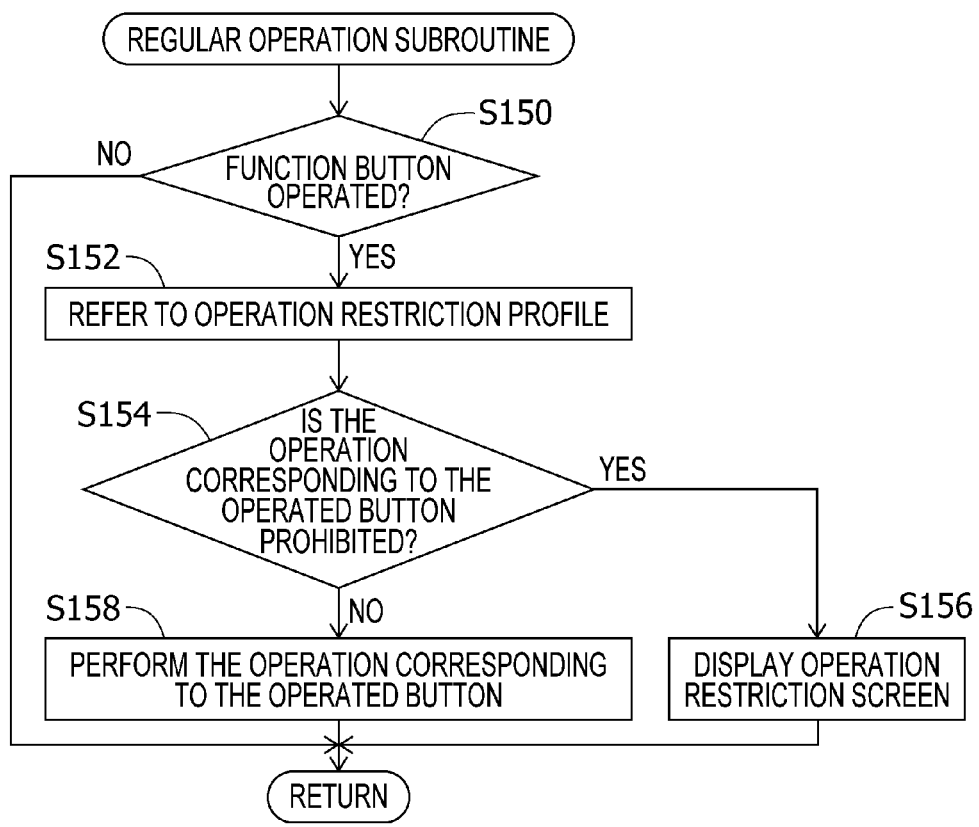

After terminating the setting operation subroutine, as shown in FIG. 9, the CPU 12 performs a regular operation subroutine (S104). In the regular operation subroutine, as shown in FIG. 13, the CPU 12 determines whether a function button 77 has been operated (S150). When determining that a function button 77 has been operated (S150: Yes), the CPU 12 refers to the operation restriction profile stored in the data storage area 46 (S152). The CPU 12 determines whether a particular operation corresponding to the operated function button 77 is prohibited in the operation restriction profile (S154).

When determining that the particular operation corresponding to the operated function button 77 is prohibited in the operation restriction profile (S154: Yes), the CPU 12 controls the display 16 to display the operation restriction screen 78 (S156). The CPU 12 terminates the regular operation subroutine. Meanwhile, when determining that the particular operation corresponding to the operated function button 77 is not prohibited in the operation restriction profile (S154: No), the CPU 12 performs the particular operation (S158). The CPU 12 terminates the regular operation subroutine. The regular operation subroutine is also terminated when the CPU 12 determines in S150 that a function button 77 has not been operated (S150: No).

After terminating the regular operation subroutine, as shown in FIG. 9, the CPU 12 determines whether time-out has occurred, or the logout button has been operated (S106). When determining that time-out has occurred, or that the logout button has been operated (S106: Yes), the CPU 12 goes back to S100. Meanwhile, When determining that time-out has not occurred, and that the logout button has not been operated (S106: No), the CPU 12 determines whether the MFP 10 has been powered off (S108). When determining that the MFP 10 has not been powered off (S108: No), the CPU 12 goes back to S102. Meanwhile, when determining that the MFP 10 has been powered off (S108: Yes), the CPU 12 terminates the process of the control program 44.

In an image processing apparatus according to aspects of the present disclosure, a controller of the apparatus is configured to control a reader to read identification information from a recording medium, and acquire particular state information indicating a particular apparatus state of the image processing apparatus. Further, a storage of the apparatus is configured to store the identification information, one or more setting operations, and one or more pieces of state information in association with each other. Each of the one or more setting operations is a previously-set operation of operations executable by the image processing apparatus. Each of the one or more pieces of state information indicates a predetermined apparatus state of apparatus states in which the image processing apparatus is allowed to be. When the acquired particular state information is coincident with a specific piece of the state information stored in the storage in association with the identification information read by the reader, a particular operation is performed that is stored in the storage in association with the specific piece of the state information. Namely, the particular operation is performed in response to the particular apparatus state of the image processing apparatus. Therefore, for instance, it is possible to perform a first operation when the image processing apparatus is in a predetermined state, and to perform a second operation different from the first operation when the image processing apparatus is not in the predetermined state. Thus, according to aspects of the present disclosure, it is possible to perform an intended one of operations without having to operate operable members such as buttons.

Hereinabove, the illustrative embodiment according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modification]

In the aforementioned illustrative embodiment, the card IDs, the operation restriction profile, the shortcut information, the user names, the folder names, and the email addresses are stored in the data storage area 46 in association with each other. Nonetheless, a part or all of the aforementioned information may be stored in one or more databases on an external or internal network. Further, the MFP 10 may be configured to acquire the aforementioned information from the one or more databases via the external or internal network.

In the aforementioned illustrative embodiment, when a card ID is not associated with any user name in the data storage area 46, the MFP 10 is not brought into the login state by use of a card with the card ID recorded therein. Nonetheless, when a card ID is associated with a predetermined user name (e.g., a guest name) in the data storage area 46, the MFP 10 may not be brought into the login state by use of a card with the card ID recorded therein.

In the aforementioned illustrative embodiment, after a particular operation using the shortcut function is performed, the first inquiry screen 80 is displayed on the display 16. Then, when the YES button 82 is operated on the first inquiry screen 80, the MFP 10 is brought into the login state. Nonetheless, after a particular operation using the shortcut function is performed, the MFP 10 may be brought into the login state without displaying the first inquiry screen 80 on the display 16.

In the aforementioned illustrative embodiment, the card with the IC chip embedded therein is employed as a recording medium for recording identification information. Nonetheless, mobile terminal devices such as smartphones and tablet computers may be employed as recording media for recording identification information. Identification information recorded in a recording medium may be read via communication other than near-field wireless communication. For instance, identification information may be acquired by scanning a barcode with an image sensor, decoding the scanned barcode, and converting the decoded barcode into a character string.

In the aforementioned illustrative embodiment, the CPU 12, which is an example of a controller, performs the operations shown in FIGS. 9 to 13. Nonetheless, the operations may be performed by another controller, such as one or more application specific integrated circuits (hereinafter referred to as "ASICs") or other logic integrated circuits. Alternatively, a combination of one or more CPUs, one or more AISCs, and one or more logic integrated circuits may perform the operations in cooperation with each other, as a controller.

The document placement portion is not limited to the examples such as the ADF and the flatbed presented in the aforementioned illustrative embodiment. For instance, when an image processing apparatus includes a card conveyance path for conveying a card document such as a plastic card as well as a sheet conveyance path, an inlet port of the card conveyance path may serve as a document placement portion. In this case, a sensor configured to detect the card document may be disposed close to the inlet port of the card conveyance path.

What is claimed is:

1. An image processing apparatus comprising:
    a reader configured to read, from a recording medium, first identification information recorded in the recording medium;
    a storage configured to store the first identification information, one or more setting operations, one or more pieces of state information, and user information in association with each other, each setting operation being a previously-set operation of operations executable by the image processing apparatus, each piece of the state information indicating a predetermined apparatus state of apparatus states in which the image processing apparatus is allowed to be; and
    a controller configured to perform operations comprising:
        controlling the reader to read the first identification information from the recording medium;
        acquiring particular state information indicating a particular apparatus state of the image processing apparatus;

determining whether the acquired particular state information is coincident with a specific piece of the state information stored in the storage in association with the first identification information read by the reader;

when determining that the acquired particular state information is coincident with a specific piece of the state information, performing a particular operation of the one or more setting operations, the particular operation being stored in the storage in association with the specific piece of the state information; and when determining that the acquired particular state information is not coincident with any piece of the state information, perform an authentication operation based on the user information stored in the storage in association with the first identification information read by the reader;

wherein the storage is further configured to store one or more permitted operations in association with the user information, the first identification information, the one or more setting operations, and the one or more pieces of state information, the one or more permitted operations being permitted to be executed by the image processing apparatus in a state where the authentication operation has been successfully performed based on the user information, and wherein the controller is further configured to, when determining that the acquired particular state information is not coincident with any piece of the state information, perform:

accepting a selection of an operation from among the one or more setting operations;

determining whether the selected operation is coincident with one of the one or more permitted operations stored in the storage in association with the first identification information read by the reader; and performing the selected operation when determining that the selected operation is coincident with one of the one or more permitted operations stored in the storage in association with the first identification information read by the reader, and not performing the selected operation when determining that the selected operation is not coincident with any of the one or more permitted operations stored in the storage in association with the first identification information read by the reader.

2. The image processing apparatus according to claim 1, further comprising:

an image reader; and a document sensor configured to detect whether there is a document placed on a document placement portion, wherein the storage is further configured to store the first identification information, an image reading operation, and document set state information in association with each other, the document set state information indicating that a document is placed on the document placement portion, the image reading operation being a setting operation of reading, by the image reader, an image of the document placed on the document placement portion.

3. The image processing apparatus according to claim 2, further comprising a plurality of sensors including the document sensor, each of the plurality of sensors being configured to detect whether there is a document placed on a corresponding one of document placement portions, wherein the storage is further configured to store a plurality of pieces of document set state information, each piece of document set state information indicating that a document is placed on a corresponding one of the document placement portions, and wherein the storage is further configured to store a plurality of setting operations in association with the plurality of pieces of document set state information, each of the plurality of setting operations being an operation of:

mutually-different operations using the image read by the image reading operation; and operations to be executed under mutually-different image reading conditions for the image reading operation.

4. The image processing apparatus according to claim 1, further comprising:

an image reader configured to read an image of a document; and a connector configured to removably connect with an external storage device, wherein the storage is further configured to store the first identification information, an image storing operation, and device connection state information in association with each other, the device connection state information indicating that the external storage device is connected with the connector, the image storing operation being a setting operation of storing, into the external storage device, the image of the document read by the image reader.

5. The image processing apparatus according to claim 1, further comprising:

a printer; and a connector configured to removably connect with an external storage device, wherein the storage is further configured to store the first identification information, a printing operation, and device connection state information in association with each other, the device connection state information indicating that the external storage device is connected with the connector, the printing operation being a setting operation of printing, by the printer, an image based on image data stored in the storage device.

6. The image processing apparatus according to claim 1, further comprising:

a printer; and a sheet sensor configured to detect whether there is a sheet placed on a sheet placement portion, wherein the storage is further configured to store the first identification information, a printing operation, and sheet set state information in association with each other, the sheet set state information indicating that a sheet is set on the sheet placement portion, the printing operation being a setting operation of printing, by the printer, an image on the sheet placed on the sheet placement portion.

7. The image processing apparatus according to claim 1, wherein the one or more setting operations are included in the one or more permitted operations.

8. The image processing apparatus according to claim 1, wherein the storage is further configured to store processor-executable instructions, and wherein the controller comprises one or more processors configured to, when executing the processor-executable instructions stored in the storage, perform the operations comprising:

controlling the reader to read the first identification information from the recording medium;

acquiring the particular state information;

determining whether the acquired particular state information is coincident with a specific piece of the state information stored in the storage in association with the first identification information read by the reader; and when determining that the acquired particular state information is coincident with a specific piece of the state information, performing the particular operation stored in the storage in association with the specific piece of the state information.

9. A method adapted to be implemented on one or more processors coupled with an image processing apparatus including a reader and a storage, the method comprising:

causing the reader to read identification information from a recording medium, the reader being configured to read, from the recording medium, the identification information recorded in the recording medium;

acquiring particular state information indicating a particular apparatus state of the image processing apparatus;

determining whether the acquired particular state information is coincident with a specific piece of state information stored in the storage in association with the identification information read by the reader, the storage being configured to store the identification information, one or more setting operations, one or more pieces of state information, and user information in association with each other, each setting operation being a previously-set operation of operations executable by the image processing apparatus, each piece of the state information indicating a predetermined apparatus state of apparatus states in which the image processing apparatus is allowed to be;

when determining that the acquired particular state information is coincident with a specific piece of the state information, performing a particular operation of the one or more setting operations, the particular operation being stored in the storage in association with the specific piece of the state information; and when determining that the acquired particular state information is not coincident with any piece of the state information, performing an authentication operation based on the user information stored in the storage in association with the first identification information read by the reader, wherein the storage is further configured to store one or more permitted operations in association with the user information, the first identification information, the one or more setting operations, and the one or more pieces of state information, the one or more permitted operations being permitted to be executed by the image processing apparatus in a state where the authentication operation has been successfully performed based on the user information, and wherein the method further comprises, when determining that the acquired particular state information is not coincident with any piece of the state information, performing:

accepting a selection of an operation from among the one or more setting operations;

determining whether the selected operation is coincident with one of the one or more permitted operations stored in the storage in association with the first identification information read by the reader; and performing the selected operation when determining that the selected operation is coincident with one of the one or more permitted operations stored in the storage in association with the first identification information read by the reader, and not performing the selected operation when determining that the selected operation is not coincident with any of the one or more permitted operations stored in the storage in association with the first identification information read by the reader.

10. A non-transitory computer-readable medium storing computer-readable instructions that are executable by one or more processors coupled with an image processing apparatus including a reader and a storage, the instructions being configured to, when executed by the one or more processors, cause the one or more processors to perform operations comprising:

controlling the reader to read first identification information from a recording medium, the reader being configured to read, from the recording medium, the first identification information recorded in the recording medium;

acquiring particular state information indicating a particular apparatus state of the image processing apparatus;

determining whether the acquired particular state information is coincident with a specific piece of state information stored in the storage in association with the first identification information read by the reader, the storage being configured to store the first identification information, one or more setting operations, one or more pieces of state information, and user information in association with each other, each setting operation being a previously-set operation of operations executable by the image processing apparatus, each piece of the state information indicating a predetermined apparatus state of apparatus states in which the image processing apparatus is allowed to be;

when determining that the acquired particular state information is coincident with a specific piece of the state information, performing a particular operation of the one or more setting operations, the particular operation being stored in the storage in association with the specific piece of the state information; and when determining that the acquired particular state information is not coincident with any piece of the state information, performing an authentication operation based on the user information stored in the storage in association with the first identification information read by the reader, wherein the storage is further configured to store one or more permitted operations in association with the user information, the first identification information, the one or more setting operations, and the one or more pieces of state information, the one or more permitted operations being permitted to be executed by the image processing apparatus in a state where the authentication operation has been successfully performed based on the user information, and wherein the instructions are further configured to cause the one or more processors to, when determining that the acquired particular state information is not coincident with any piece of the state information, perform:

accepting a selection of an operation from among the one or more setting operations;

determining whether the selected operation is coincident with one of the one or more permitted operations stored in the storage in association with the first identification information read by the reader; and performing the selected operation when determining that the selected operation is coincident with one of the one or more permitted operations stored in the storage in association with the first identification information read by the reader, and not performing the selected operation when determining that the selected operation is not coincident with any of the one or more permitted operations stored in the storage in association with the first identification information read by the reader.

\* \* \* \* \*